(12) United States Patent
Ishii

(10) Patent No.: US 7,738,769 B2
(45) Date of Patent: Jun. 15, 2010

(54) METHOD AND APPARATUS FOR PROCESSING VIDEO DATA CONTAINING A PLURALITY OF VIDEO TRACKS

(75) Inventor: Yoshiki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 10/903,009

(22) Filed: Aug. 2, 2004

(65) Prior Publication Data

US 2005/0031304 A1 Feb. 10, 2005

(30) Foreign Application Priority Data

Aug. 7, 2003 (JP) ............................. 2003-288867

(51) Int. Cl.
 H04N 5/76 (2006.01)
 H04N 7/00 (2006.01)
 H04N 5/00 (2006.01)
(52) U.S. Cl. ........................................ 386/52; 386/125
(58) Field of Classification Search .................. 386/55, 386/56, 95
See application file for complete search history.

(56) References Cited

U.S. PATENT DOCUMENTS

| | | | | |
|---|---|---|---|---|
| 6,404,978 B1 * | 6/2002 | Abe | ............................. | 386/55 |
| 6,477,315 B1 * | 11/2002 | Ohomori | ..................... | 386/55 |
| 6,542,692 B1 * | 4/2003 | Houskeeper | ................. | 386/52 |
| 6,674,955 B2 * | 1/2004 | Matsui et al. | ................. | 386/52 |
| 6,785,464 B1 * | 8/2004 | Kato | ............................. | 386/52 |
| 6,856,755 B1 * | 2/2005 | Lin et al. | ....................... | 386/52 |
| 7,020,381 B1 * | 3/2006 | Kato et al. | ..................... | 386/52 |
| 7,187,842 B2 * | 3/2007 | Ninomiya | ..................... | 386/52 |
| 7,206,892 B2 * | 4/2007 | Kim et al. | ..................... | 711/100 |
| 7,221,855 B2 * | 5/2007 | Kim et al. | ..................... | 386/96 |
| 7,236,687 B2 * | 6/2007 | Kato et al. | ..................... | 386/95 |
| 7,469,093 B2 * | 12/2008 | Ishii | ............................. | 386/52 |
| 7,626,617 B2 * | 12/2009 | Terada | ......................... | 348/239 |
| 7,643,723 B2 * | 1/2010 | Ishii | ............................. | 386/52 |
| 2001/0004417 A1 * | 6/2001 | Narutoshi et al. | ............... | 386/52 |
| 2002/0150383 A1 * | 10/2002 | Kato et al. | ..................... | 386/69 |
| 2002/0164152 A1 * | 11/2002 | Kato et al. | ..................... | 386/95 |
| 2003/0103604 A1 * | 6/2003 | Kato et al. | ..................... | 379/68 |
| 2003/0156825 A1 * | 8/2003 | Um et al. | ........................ | 386/69 |
| 2005/0019007 A1 * | 1/2005 | Kato et al. | ..................... | 386/69 |
| 2007/0016317 A1 * | 1/2007 | Kim et al. | ..................... | 700/94 |
| 2007/0118590 A1 * | 5/2007 | Giacalone, Jr. | ............... | 709/201 |

FOREIGN PATENT DOCUMENTS

JP 2002-218385 8/2003

* cited by examiner

*Primary Examiner*—Thai Tran
*Assistant Examiner*—Gelek Topgyal
(74) *Attorney, Agent, or Firm*—Fitzpatrick, Cella, Harper & Scinto

(57) ABSTRACT

This invention provides a method and apparatus for processing video data containing a plurality of video tracks. According to an aspect of this invention, new modified data is generated by modifying part of the plurality of video tracks. After that, play list data to control the video data playback sequence to play back the generated modified data in place of data of the part is generated.

11 Claims, 20 Drawing Sheets

| TRACK | | Video Track-1 | Video Track-2 | Rendering Clip Track | Effect Track | |
|---|---|---|---|---|---|---|
| CONTENT MANAGEMENT | CONTENT ID | A-1 | B-1 | R-1 | E-1 | E-2 |
| | CONTENT | Mpeg2 | Mpeg2 | Mpeg2 | Effect_Off,Rc_Off | Effect_On,Rc_On <Ref=Rendering Clip Track,Blk=1-2, Sw=On,In=3,Out=4,Shift=1> |

CONTENT MANAGEMENT DATA

FIG. 5A

| TRACK | Video Track-1 | Video Track-2 |
|---|---|---|
| REFERENCE FILE | MovieA.mpg | MovieB.mpg |

REFERENCE TABLE

FIG. 5B

| TRACK | | Video Track-1 | Video Track-2 |
|---|---|---|---|
| PLAY LIST | START TIME | 0 | Blank | 0 |
| | LENGTH | 4 | 4 | 4 |

PLAY LIST DATA

FIG. 5C

| TRACK | | Video Track-1 | Video Track-2 |
|---|---|---|---|
| CONTENT MANAGEMENT | CONTENT ID | A-1 | B-1 |
| | CONTENT | Mpeg2 | Mpeg2 |

CONTENT MANAGEMENT DATA

FIG. 5D

| TRACK | | Video Track-1 | | | | | | | | Video Track-2 | | | | | | | |
|---|---|---|---|---|---|---|---|---|---|---|---|---|---|---|---|---|---|
| BLOCK MANAGEMENT | NUMBER | 1 | 2 | 3 | 4 | 5 | 6 | 7 | 8 | 1 | 2 | 3 | 4 | 5 | 6 | 7 | 8 |
| | TIME | 0.0 | 0.5 | 1.0 | 1.5 | 2.0 | 2.5 | 3.0 | 3.5 | 0.0 | 0.5 | 1.0 | 1.5 | 2.0 | 2.5 | 3.0 | 3.5 |
| | CONTENT ID | A-1 | | | | | | | | B-1 | | | | | | | |

BLOCK MANAGEMENT DATA

FIG. 9A

| TRACK | Video Track-1 | Video Track-2 | Rendering Clip Track | Effect Track |
|---|---|---|---|---|
| REFERENCE FILE | MovieA.mpg | MovieB.mpg | RndC.mpg | Effect.dcr |

REFERENCE TABLE

FIG. 9B

| TRACK | | Video Track-1 | Video Track-2 | Effect Track |
|---|---|---|---|---|
| PLAY LIST | START TIME | 0 | 0 | 0 |
| | LENGTH | 4 | Blank 3 | 7 |
| | | | 4 | Shft=1 |

PLAY LIST DATA

FIG. 9C

| TRACK | | Video Track-1 | Video Track-2 | Rendering Clip Track | Effect Track |
|---|---|---|---|---|---|
| CONTENT MANAGEMENT | CONTENT ID | A-1 | B-1 | R-1 | E-1 / E-2 |
| | CONTENT | Mpeg2 | Mpeg2 | Mpeg2 | Effect_Off,Rc_Off / Effect_On,Rc_On <Ref=Rendering Clip Track,Blk=1-2, Sw=On,In=3,Out=4,Shift=1> |

CONTENT MANAGEMENT DATA

FIG. 9D

| TRACK | | Video Track-1 | | | | | | | | Video Track-2 | | | | | | | | Rendering Clip Track | | | | | | | | Effect Track | | | |
|---|---|---|---|---|---|---|---|---|---|---|---|---|---|---|---|---|---|---|---|---|---|---|---|---|---|---|---|---|---|
| BLOCK MANAGEMENT | NUMBER | 1 | 2 | 3 | 4 | 5 | 6 | 7 | 8 | 1 | 2 | 3 | 4 | 5 | 6 | 7 | 8 | 1 | 2 | | | | | | | 1 | 2 | 3 | 4 |
| | TIME | 0.0 | 0.5 | 1.0 | 1.5 | 2.0 | 2.5 | 3.0 | 3.5 | 0.0 | 0.5 | 1.0 | 1.5 | 2.0 | 2.5 | 3.0 | 3.5 | 0.0 | 0.5 | | | | | | | 0.0 | 0.5 | 3.0 | 4.0 |
| | CONTENT ID | A-1 | | | | | | | | B-1 | | | | | | | | R-1 | | | | | | | | E-1 | E-1 | E-2 | E-1 |

Blk=1-2

BLOCK MANAGEMENT DATA

F I G. 10

| REAL DATA | Effect | | |
|---|---|---|---|
| BLOCK NUMBER | 1 | 2 | 3 |
| EFFECT TYPE | No Effect | Wipe | No Effect |
| SOURCE TRACK | Video Track-1 | Video Track-1, Video Track-2 | Video Track-2 |

EFFECT DESCRIPTION DATA (Effect.dcr)

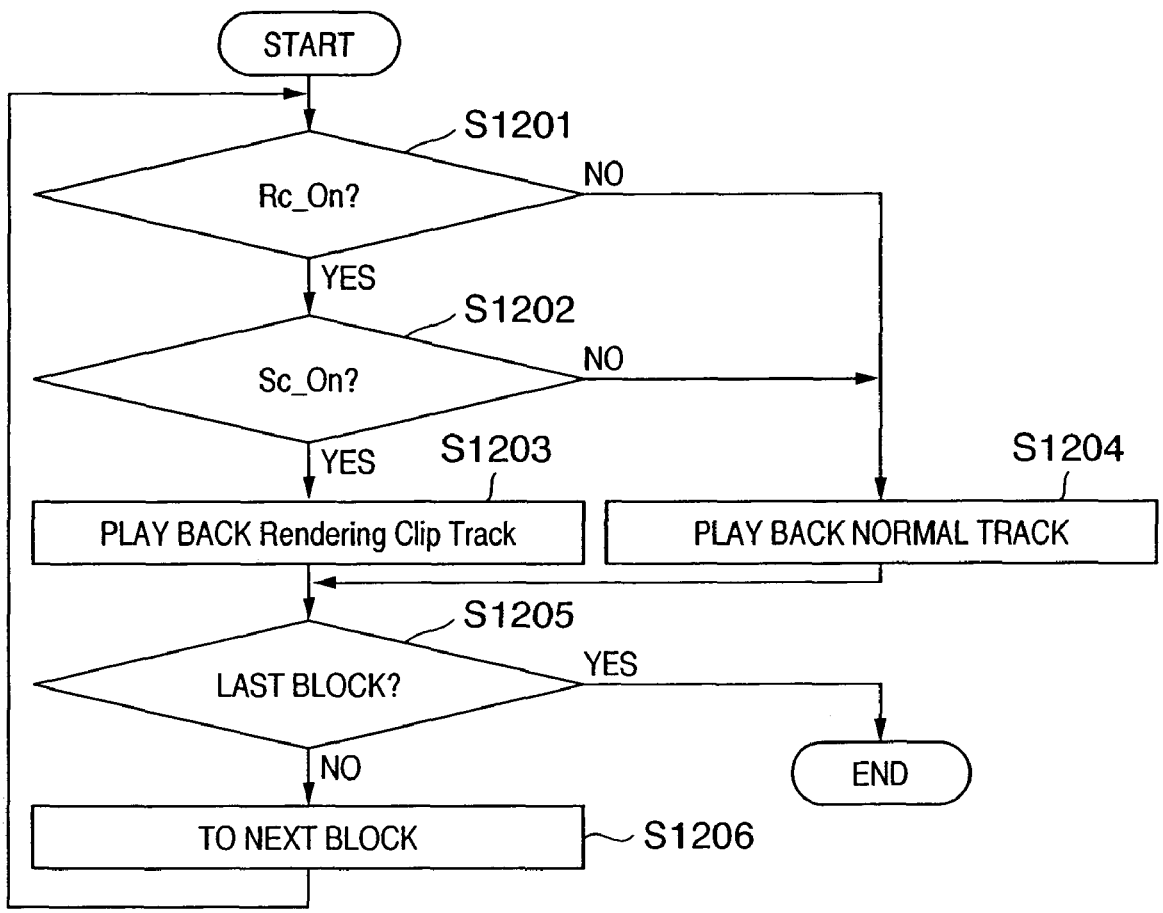
F I G. 12

FIG. 14A

| TRACK | Video Track-1 | Video Track-2 | Rendering Clip Track | Effect Track |
|---|---|---|---|---|
| REFERENCE FILE | MovieA.mpg | MovieB.mpg | RndC.mpg | Effect.dcr |

REFERENCE TABLE

FIG. 14B

| TRACK | | Video Track-1 | Video Track-2 | Effect Track |
|---|---|---|---|---|
| PLAY LIST | START TIME | 0 | Blank | 0 |
| | LENGTH | 4 | 2.5 | 6.5 |

Shft=1.5

PLAY LIST DATA

FIG. 14C

| TRACK | Video Track-1 | Video Track-2 | Rendering Clip Track | Effect Track |
|---|---|---|---|---|
| CONTENT MANAGEMENT | CONTENT ID | A-1 | B-1 | R-1 | E-1 |
| | CONTENT | Mpeg2 | Mpeg2 | Mpeg2 | Effect_Off,Rc_Off |

| | | | | E-2 |
| | | | | Effect_On,Rc_On <Ref=Rendering Clip Track,Blk=1-3, Sw=On,In=2.7,Out=3.7,Shift=1.5> |

CONTENT MANAGEMENT DATA

FIG. 14D

Blk=1-3

| TRACK | Video Track-1 | | | | | | | | Video Track-2 | | | | | | | | Rendering Clip Track | | | Effect Track | | | |
|---|---|---|---|---|---|---|---|---|---|---|---|---|---|---|---|---|---|---|---|---|---|---|---|
| BLOCK MANAGEMENT | NUMBER | 1 | 2 | 3 | 4 | 5 | 6 | 7 | 8 | 1 | 2 | 3 | 4 | 5 | 6 | 7 | 8 | 1 | 2 | 3 | 1 | 2 | 3 |
| | TIME | 0.0 | 0.5 | 1.0 | 1.5 | 2.0 | 2.5 | 3.0 | 3.5 | 0.0 | 0.5 | 1.0 | 1.5 | 2.0 | 2.5 | 3.0 | 3.5 | 0.0 | 0.5 | 1.0 | 0.0 | 2.5 | 4.0 |
| | CONTENT ID | A-1 | | | | | | | | B-1 | | | | | | | | R-1 | | | E-1 | E-2 | E-1 |

BLOCK MANAGEMENT DATA

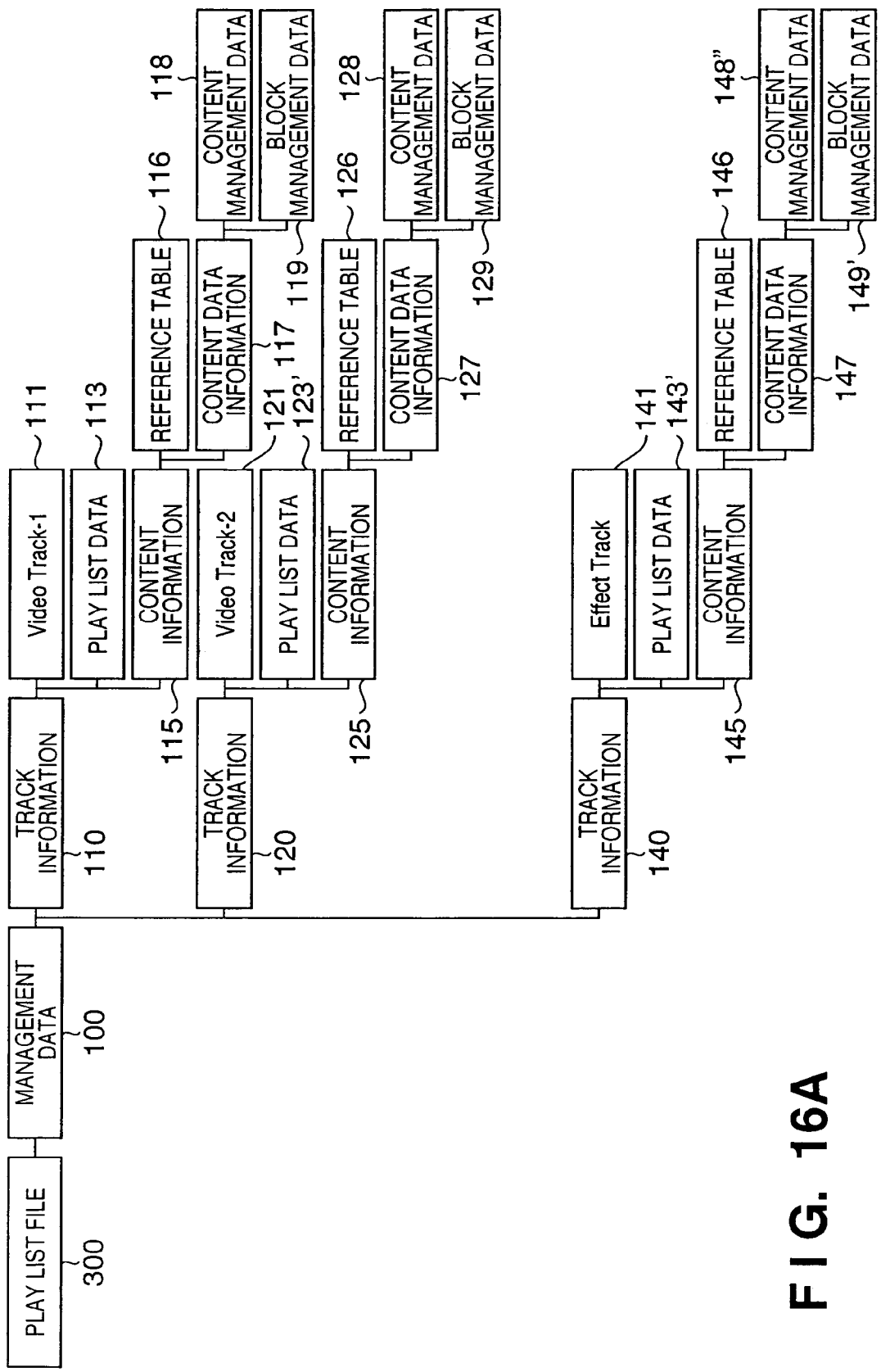
F I G. 16A

FIG. 17A

| TRACK | Video Track-1 | Video Track-2 | Effect Track |
|---|---|---|---|
| REFERENCE FILE | MovieA.mpg | MovieB.mpg | Effect.dcr |

REFERENCE TABLE

FIG. 17B

| TRACK | | Video Track-1 | Video Track-2 | Effect Track |
|---|---|---|---|---|
| PLAY LIST | START TIME | 0 | 0 | 0 |
| | LENGTH | 4 | 3 | 7 |
| | | | Blank | |
| | | 4 | 4 | |

PLAY LIST DATA

FIG. 17C

| TRACK | | Video Track-1 | Video Track-2 | Effect Track | |
|---|---|---|---|---|---|
| CONTENT MANAGEMENT | CONTENT ID | A-1 | B-1 | E-1 | E-2 |
| | CONTENT | Mpeg2 | Mpeg2 | Effect_Off | Effect_On |

CONTENT MANAGEMENT DATA

FIG. 17D

| TRACK | | Video Track-1 | | | | | | | | Video Track-2 | | | | | | | | Effect Track | | | |
|---|---|---|---|---|---|---|---|---|---|---|---|---|---|---|---|---|---|---|---|---|---|
| BLOCK MANAGEMENT | NUMBER | 1 | 2 | 3 | 4 | 5 | 6 | 7 | 8 | 1 | 2 | 3 | 4 | 5 | 6 | 7 | 8 | 1 | 2 | 3 | |
| | TIME | 0.0 | 0.5 | 1.0 | 1.5 | 2.0 | 2.5 | 3.0 | 3.5 | 0.0 | 0.5 | 1.0 | 1.5 | 2.0 | 2.5 | 3.0 | 3.5 | 0.0 | 3.0 | 4.0 | |
| | CONTENT ID | A-1 | | | | | | | | B-1 | | | | | | | | E-1 | E-2 | E-1 | |

BLOCK MANAGEMENT DATA

F I G. 18

| REAL DATA | Effect | | |
|---|---|---|---|
| BLOCK NUMBER | 1 | 2 | 3 |
| EFFECT TYPE | No Effect | Wipe | No Effect |
| SOURCE TRACK | Video Track-1 | Video Track-1, Video Track-2 | Video Track-2 |

EFFECT DESCRIPTION DATA (Effect.dcr)

METHOD AND APPARATUS FOR PROCESSING VIDEO DATA CONTAINING A PLURALITY OF VIDEO TRACKS

FIELD OF THE INVENTION

The present invention relates to a method and apparatus for processing video data and, more particularly, to control of the video signal playback sequence.

BACKGROUND OF THE INVENTION

In recent years, devices such as digital VTRs and DVD players which process digital moving image signals have widely spread. Along with the advance of AV devices and computer devices, editing of moving images is becoming popular not only in studios but also at home. In some systems developed for editing of moving images, playback description data called a play list is created to switch between a plurality of moving images, or video effect processing is executed in real time during playback to largely shorten the time for moving image editing. As such a movie format, QuickTime available from Apple is known. QuickTime can handle a plurality of video and audio tracks. It can also set a video transition effect between tracks.

FIG. 15 is a view of track images when a transition effect of wipe is set for a multi-track play list as a real time effect in the playback mode.

MovieA.mpg is set from 0 to 4 sec in Video Track-1. MovieB.mpg is set from 3 to 7 sec in Video Track-2. The playback designation time of Video Track-2 leads the end time of Video Track-1 by 1 sec. This is because the transition effect by wipe is produced at this 1-sec overlap between Video Track-1 and Video Track-2.

Effect Track is data to control effect application to the two tracks. In this example, Effect Track is divided into three blocks. From 1 to 3 sec, Video Track-1 is played back without any effect. From 3 to 4 sec, the transition effect is applied between Video Track-1 and Video Track-2. From 4 to 7 sec, Video Track-2 is played back without any effect.

FIGS. 16A and 16B show the data tree structure of this play list.

Referring to FIG. 16A, reference numeral 300 denotes an overall play list; and 100, management information. The management information contains tracks 110, 120, and 140 which have track IDs 111, 121, and 141 and play list data 113, 123', and 143', respectively. Contents 115, 125, and 145 in the tracks have reference tables 116 and 126 as reference information to the actual movie take files or reference information 146 to the effect description file, and pieces of content data information 117, 127, and 147, respectively. The pieces of content data information contain content management data 118, 128, and 148" containing detailed information of the contents, and block management data 119, 129, and 149' which manage the playback times of data blocks in the contents.

Referring to FIG. 16B, an effect description file 200 contains processing description blocks 201, 202, and 203.

FIGS. 17A to 17D show the actual data structure of the play list.

FIG. 17A shows examples of the reference tables 116, 126, and 146 shown in FIG. 16A. MovieA.mpg is described in the reference table 116 of Video Track-1. MovieB.mpg is described in the reference table 126 of Video Track-2. An effect description file Effect.dcr is described in the reference table 146 of Effect Track.

FIG. 17B shows examples of the play list data 113, 123', and 143' shown in FIG. 16A. In Video Track-1, playback of 4 sec from the start is set. In Video Track-2, playback of 4 sec from the start is set after a blank of 3 sec. In Effect Track, playback of 7 sec from the start is set. With this setting, play list payback of 7 sec in total described with reference to FIG. 15 is done.

FIG. 17C shows examples of the content management data 118, 128, and 148" shown in FIG. 16A. In the content management data 118 of Video Track-1, A-1 is set as the content ID, and Mpeg2 movie is set as the content. In the content management data 128 of Video Track-2, B-1 is set as the content ID, and Mpeg2 movie is set as the content. In the content management data 148" of Effect Track, E-1 and E-2 are set as the content IDs.

E-1 indicates the Effect Track content corresponding to the no-effect portions of 0 to 3 sec and 4 to 7 sec described with reference to FIG. 15. Effect_Off is set as a flag for effect control. E-2 indicates the Effect Track content corresponding to the portion of 3 to 4 sec in FIG. 15. Effect_On is set for real-time effect processing.

FIG. 17D shows examples of the block management data 119, 129, and 149' shown in FIG. 16A. In the block management data 119 of Video Track-1, a playback time table of data blocks 1 to 8 is set in correspondence with the content with the ID A-1. In the block management data 129 of Video Track-2, a playback time table of data blocks 1 to 8 is set in correspondence with the content with the ID B-1. For Effect Track, a playback time table of data blocks 1 and 3 is set in correspondence with the content with the ID E-1, and a playback time table of data block 2 is set in correspondence with the content with the ID E-2. This description indicates that, in FIG. 15, each of MovieA.mpg and MovieB.mpg contains eight blocks of 0.5 sec each, and Effect.dcr contains two data blocks of 0.5 sec each, which should sequentially be played back.

FIG. 18 shows an example of the effect description file 200. In block 1 of data blocks 1 to 3 of Effect Track, the effect type is No Effect, and the source is Video Track-1. In block 2, the effect type is Wipe, and Video Track-1 and Video Track-2 are set as the source. That is, the type of real-time effect is designated. In block 3, the effect type is No Effect, and the source is Video Track-2.

Such a video effect in playback requires a high player function. Especially, it is difficult to execute effect processing while playing back a plurality of video tracks, as in the transition effect. Japanese Patent Laid-Open No. 2002-218385 proposes a description method, in which a moving image file prepared by rendering only the effect portion in advance is inserted during playback in a playback description language such as SMIL. With this method, playback with an advanced effect can be executed even by a player with a low processing power.

However, the technique disclosed in Japanese Patent Laid-Open No. 2002-218385 is implemented on the basis of a data structure mainly composed of a single video track. This invention can hardly directly be applied to a moving image format such as QuickTime which has a plurality of video tracks.

SUMMARY OF THE INVENTION

It is an object of the present invention to solve at least the above problem and allow a powerless apparatus to play back image data containing a plurality of video tracks that have undergone advanced modification.

The above object is achieved by a method and apparatus for processing video data containing a plurality of video tracks of the present invention. According to an aspect of the present invention, new modified data is generated by modifying part of the plurality of video tracks. After that, play list data to control the video data playback sequence to play back the generated modified data in place of data of the part is generated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 5A to 5D are views showing an example of the play list data according to the embodiment of the present invention;

FIGS. 9A to 9D are views showing an example of the play list data according to the embodiment of the present invention;

FIG. 10 is a view showing an example of effect description data according to the embodiment of the present invention;

FIG. 12 is a flowchart showing play list playback processing according to the embodiment of the present invention;

FIGS. 14A to 14D are views showing play list data with effect according to the embodiment of the present invention, in which the data block boundary is adjusted;

FIGS. 16A and 16B are views showing the tree structure of conventional play list data;

FIGS. 17A to 17D are views showing an example of the conventional play list data; and FIG. 18 is a view showing an example of conventional effect description data.

DETAILED DESCRIPTION OF THE PREFERRED EMBODIMENTS

A preferred embodiment of the present invention will now be described in detail in accordance with the accompanying drawings.

In the following embodiment, processing of moving image signals will mainly be described. Audio signal can also be processed in a similar manner.

Figure 1:
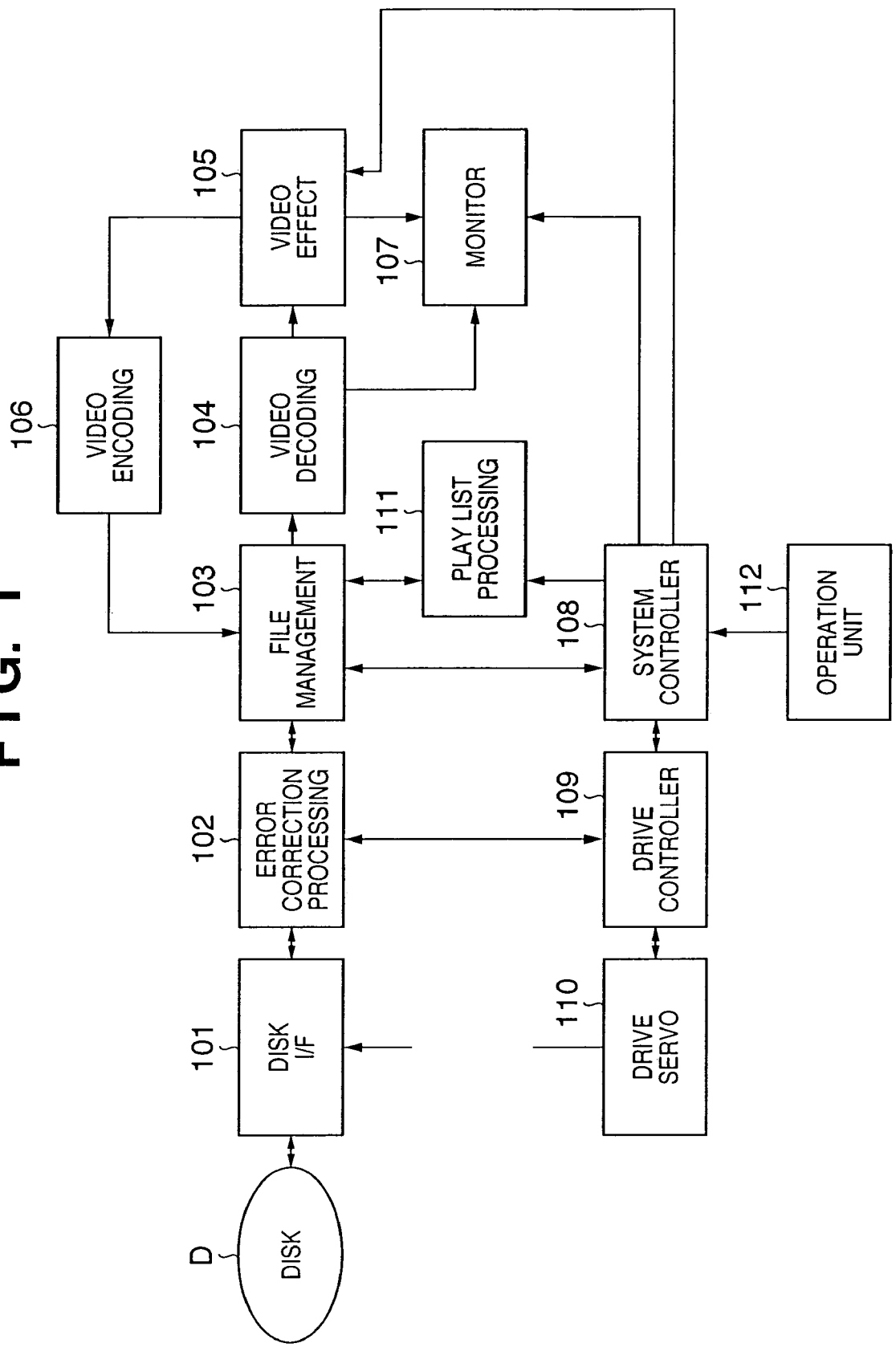
FIG. 1 is a block diagram showing an arrangement example of an image processing apparatus according to an embodiment of the present invention.

FIG. 1 is a block diagram showing the arrangement of an image processing apparatus according to the embodiment of the present invention.

Referring to FIG. 1, a drive controller 109 inputs a signal to a drive servo circuit 110 in accordance with a request from a system controller 108 to control the optical pickup and motor in a disk interface (I/F) 101, thereby controlling the data read from a disk D.

For data read from the disk D by the disk I/F 101, an error correction processing circuit 102 corrects defects in the medium or errors in recording/playback. A file management circuit 103 detects various kinds of data from the error-corrected data sequence and outputs image data to a video decoding circuit 104 and management data to the system controller 108. The file management circuit 103 also outputs play list data to a play list processing circuit 111.

The system controller 108 controls the data read from the disk D to obtain desired recording data.

An editing operation input circuit 112 operates an operation window for editing by using thumbnails of moving image data displayed on a monitor 107. The system controller 108 controls the play list processing circuit 111 on the basis of a received editing instruction to create play list data containing a play list as the editing result. When an existing play list is to be edited, the file management circuit 103 outputs decoded play list data to the play list processing circuit 111. The play list data is changed by the editing operation by the system controller 108 to create play list data. The file management circuit 103 converts the play list data into a file format and outputs it to the error correction processing circuit 102. The play list data is recorded on the disk D by the disk I/F 101.

The error correction processing circuit 102 adds parity data to correct errors in digital data. The drive controller 109 outputs a signal to the drive servo circuit 110 in accordance with a request from the system controller 108 to control the optical pickup and motor in the disk I/F 101.

The video decoding circuit 104 decodes encoded video data which is read out from a movie take file as the entity of moving image data, and supplies the decoded data to a video effect circuit 105 and monitor 107. The video effect circuit 105 executes video effect processing (modification processing) for moving image data from a single or a plurality of video tracks and outputs the data to a video encoding circuit 106. The video encoding circuit 106 encodes the image data from the video effect circuit 105 and outputs the encoded data to the file management circuit 103. The file management circuit 103 outputs, to the error correction processing circuit 102, the effect-processed and encoded data output from the video encoding circuit 106 as a rendering clip file, i.e., a movie take file containing the moving image data of the video effect portion. The data is recorded on the disk D by the disk I/F 101.

Processing according to this embodiment will be described by using examples of a play list file and rendering clip.

Figure 2:
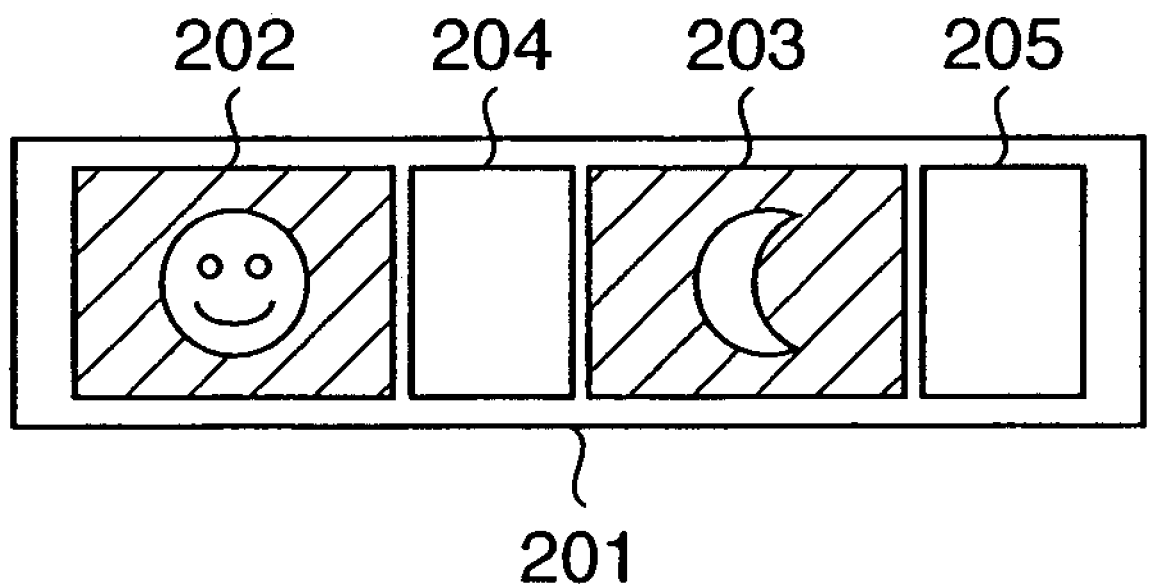
FIG. 2 is a view showing an example of a story board editing window according to the embodiment of the present invention.

FIG. 2 is a view showing an example of an editing window for a simple play list containing two moving images.

Reference numeral 201 denotes a story board in which the thumbnails of moving image files are displayed in accordance with the playback order. Reference numerals 202 and 203 denote a thumbnail of a first moving image file MovieA.mpg and a thumbnail of a second moving image file MovieB.mpg, respectively. The transition effects between moving images are set in input boxes 204 and 205. In this example, no transition effect is set.

Figure 3:
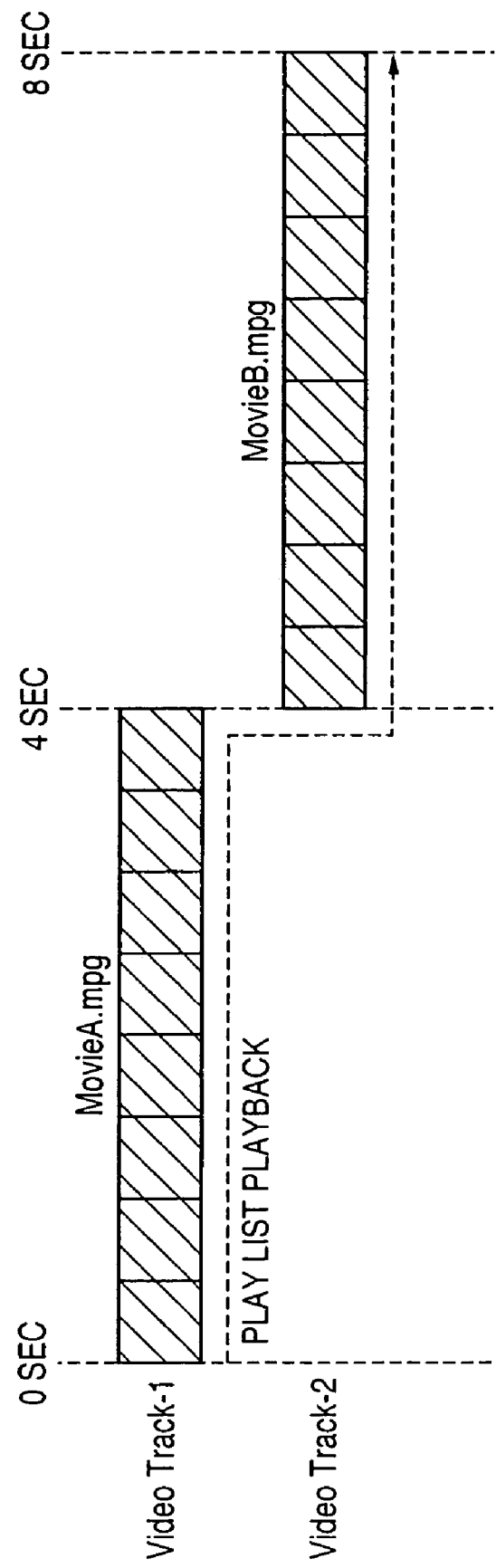
FIG. 3 is a view for explaining play list playback according to the embodiment of the present invention.

FIG. 3 shows the track image of the play list. MovieA.mpg is set from 0 to 4 sec in Video Track-1. MovieB.mpg is set from 4 to 8 sec in Video Track-2. When play list playback is done for this data, MovieA.mpg is played back from 0 to 4 sec, and MovieB.mpg is played back from 4 to 8 sec.

Figure 4:
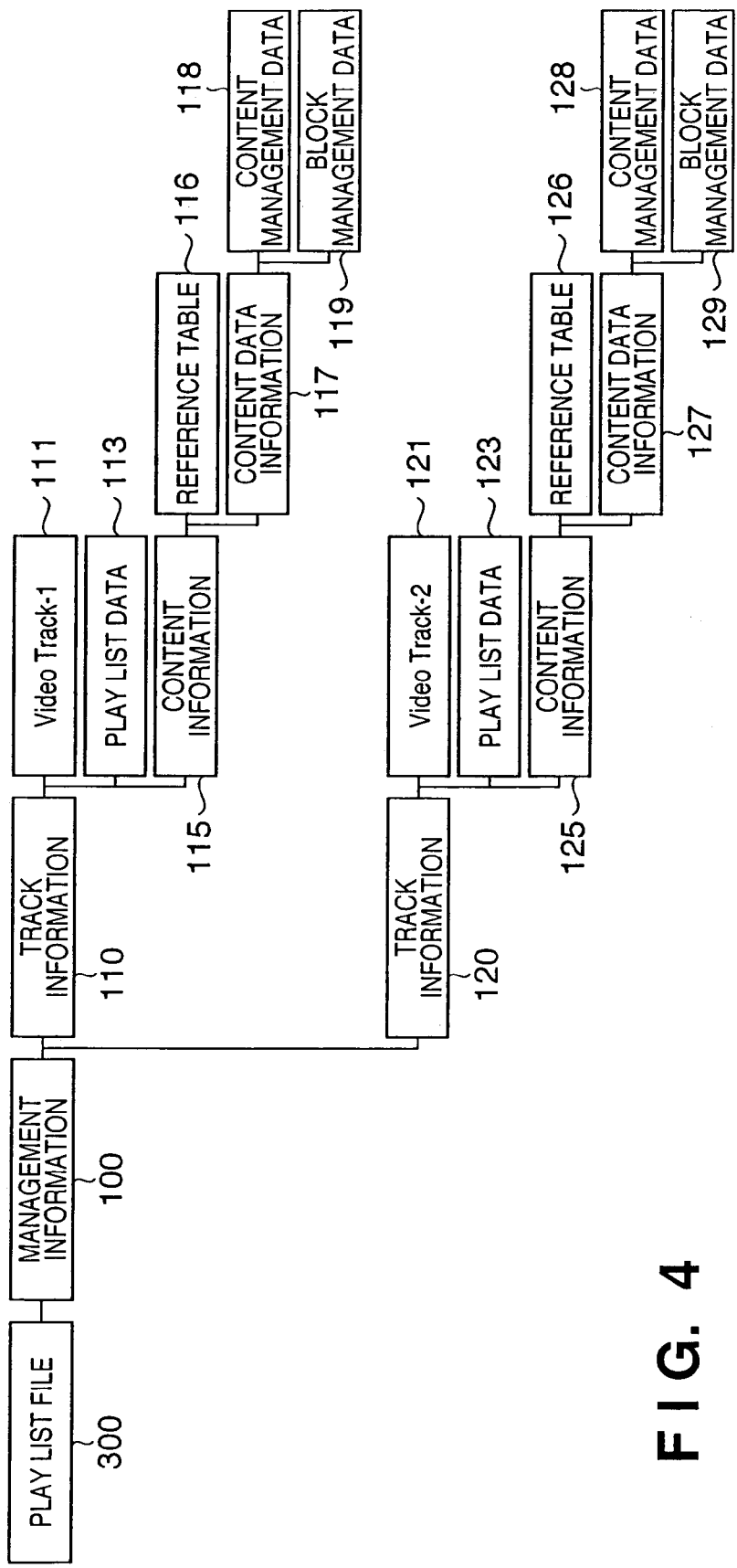
FIG. 4 is a view showing the tree structure of play list data according to the embodiment of the present invention.

FIG. 4 shows the data tree structure of the play list. Reference numeral 300 denotes an overall play list; and 100, management information in the play list. The management information contains tracks 110 and 120 which have track IDs 111 and 121 and play list data 113 and 123, respectively. Contents 115 and 125 in the tracks have reference tables 116 and 126 as reference information to the actual movie take files and pieces of content data information 117 and 127, respectively. The pieces of content data information include content management data 118 and 128 containing detailed information of the contents and block management data 119 and 129 which manage the playback times of data blocks in the contents, respectively.

FIGS. 5A to 5D show the actual data structure of the play list.

FIG. 5A shows the reference tables 116 and 126 shown in FIG. 4. MovieA.mpg is set in the reference table 116 of Video Track-1. MovieB.mpg is set in the reference table 126 of Video Track-2. FIG. 5B shows the play list data 113 and 123 shown in FIG. 4. In the play list data 113 of Video Track-1, playback of 4 sec from the start is set. In the play list data 123 of Video Track-2, playback of 4 sec from the start is set after a blank of 4 sec. With this setting, play list payback of 8 sec in total described with reference to FIG. 3 is done.

FIG. 5C shows the content management data 118 and 128 shown in FIG. 4. In the content management data 118 of Video Track-1, A-1 is set as the content ID, and Mpeg2 movie is set as the content. In the content management data 128 of Video Track-2, B-1 is set as the content ID, and Mpeg2 movie is set as the content.

FIG. 5D shows the block management data 119 and 129 shown in FIG. 4. In the block management data 119 of Video Track-1, a playback time table of data blocks 1 to 8 is set in correspondence with the content with the ID A-1. In the block management data 129 of Video Track-2, a playback time table of data blocks 1 to 8 is set in correspondence with the content with the ID B-1. This description indicates that, in FIG. 3, each of MovieA.mpg and MovieB.mpg contains eight blocks of 0.5 sec each, which should sequentially be played back.

Figure 6:
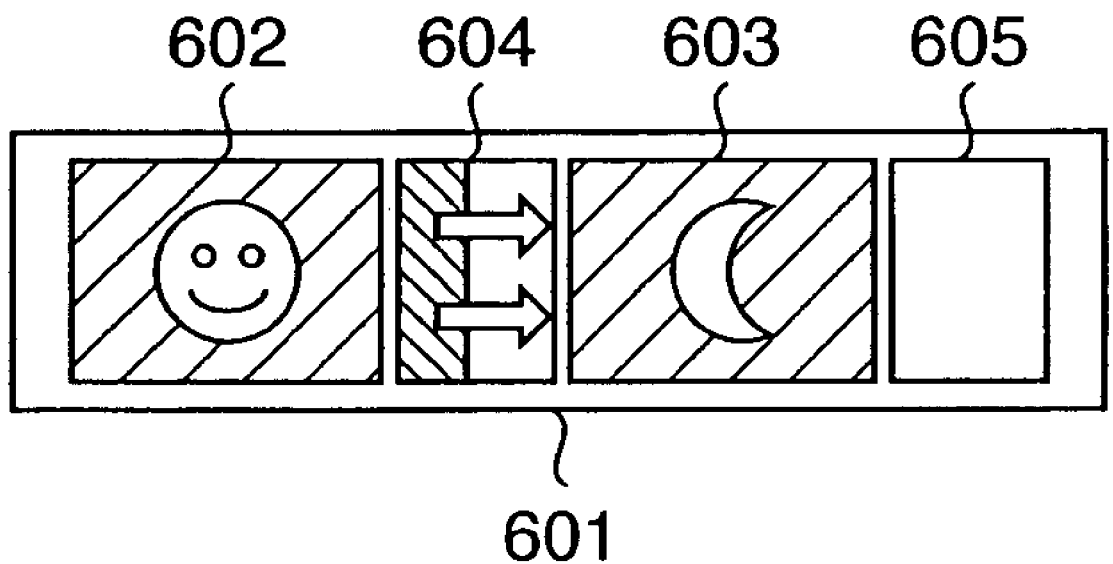
FIG. 6 is a view showing an example of a story board editing window with effect according to the embodiment of the present invention.

FIG. 6 is a view showing a state in which a transition effect by wipe is set for the simple play list data shown in FIG. 3. Reference numeral 601 denotes a story board in which the thumbnails of moving image files are displayed in accordance with the playback order. Reference numerals 602 and 603 denote a thumbnail of the first moving image file MovieA.mpg and a thumbnail of the second moving image file MovieB.mpg, respectively. The transition effects between moving images are set in input boxes 604 and 605. A wipe effect is set in the input box 604 as a transition effect.

Figure 7:
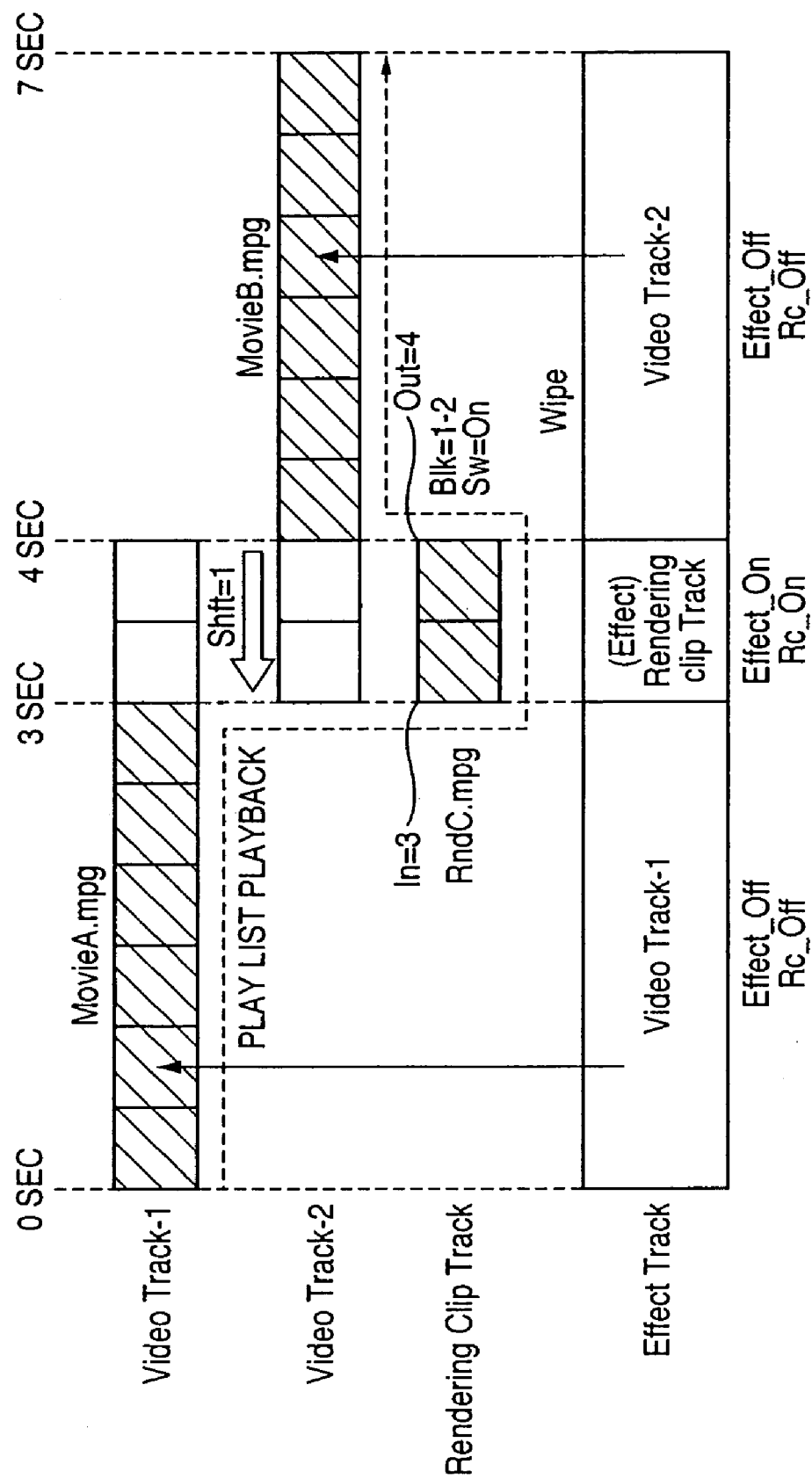
FIG. 7 is a view for explaining play list playback with effect according to the embodiment of the present invention.

FIG. 7 shows the track image of the play list.

MovieA.mpg is set from 0 to 4 sec in Video Track-1. MovieB.mpg is set from 3 to 7 sec in Video Track-2. The playback designation time of the Video Track-2 leads that shown in FIG. 3 by 1 sec. This is because the transition effect by wipe is produced at this 1-sec overlap between Video Track-1 and Video Track-2. In FIG. 7, only MovieB.mpg is shifted because only Video Track-2 follows as a moving image. If another moving image follows, the same shift as described above is done even for the subsequent play list portion.

The shift of subsequent data is necessary for specific video effects that require time overlap, including the transition effect between moving images. Effects such as fade-in, fade-out, or color effect for a single moving image which cause no overlap do not require the data shift.

Rendering Clip Track is a track to designate a rendering clip, i.e., a movie take file which is newly created by adding the effect to extract the effect application portion. A 1-sec movie take file RndC.mpg is set in this track. RndC.mpg is created from a moving image generated by executing the wipe effect for 1 sec at the end of MovieA.mpg and 1 sec at the start of MovieB.mpg. Effect Track is data which controls effect application for the three blocks including the three tracks. Effect Track holds information about the rendering clip as the characteristic feature of this embodiment.

Shft is data which holds the log of 1-sec advance of MovieB.mpg, i.e., the subsequent moving image as the overlap amount by addition of the transition effect. This data is recorded in the content management data of Effect Track.

As described above, when the effect requires no overlap, the subsequent moving image data is not shifted. Hence, Shft=0.

In and Out respectively represent the start position and end position of the actual transition effect in the rendering clip. In and Out are recorded in the content management data of Effect Track. A playback flag which controls playback of the rendering clip is also recorded. When Sw=On, Rendering Clip Track is played back with a higher priority than the original video tracks Video Track-1 and Video Track-2 during the rendering clip period in the playback mode. In this example, MovieA.mpg is played back until 3 sec from the start of play list playback. Next, RndC.mpg is played back from 3 to 4 sec in accordance with the playback flag of the rendering clip. Finally, MovieB.mpg is played back from 4 to 7 sec.

Information which makes the content of Effect Track correspond to the data block of Rendering Clip Track is recorded in the content management data of Effect Track as Blk information. In this example, it is recorded that blocks 1 and 2 of Rendering Clip Track correspond to the content of Effect Track.

When a plurality of rendering clips are assigned to Rendering Clip Track, the above information is used to make effect blocks on the play list correspond to the rendering clips.

Information representing the effect content of the rendering clip is recorded in the effect description data. In this example, it is recorded that the effect type is Wipe effect. The effect content information is used to indicate that the transition effect is Wipe in, e.g., the input box 604 in FIG. 6 which shows an example of the story board editing window.

A flag to execute processing by the above-described rendering clip is also recorded in the content management data of Effect Track as Re_On. If no rendering clip is present, Re_Off is set, and the above-described processing is skipped.

Figure 8A:
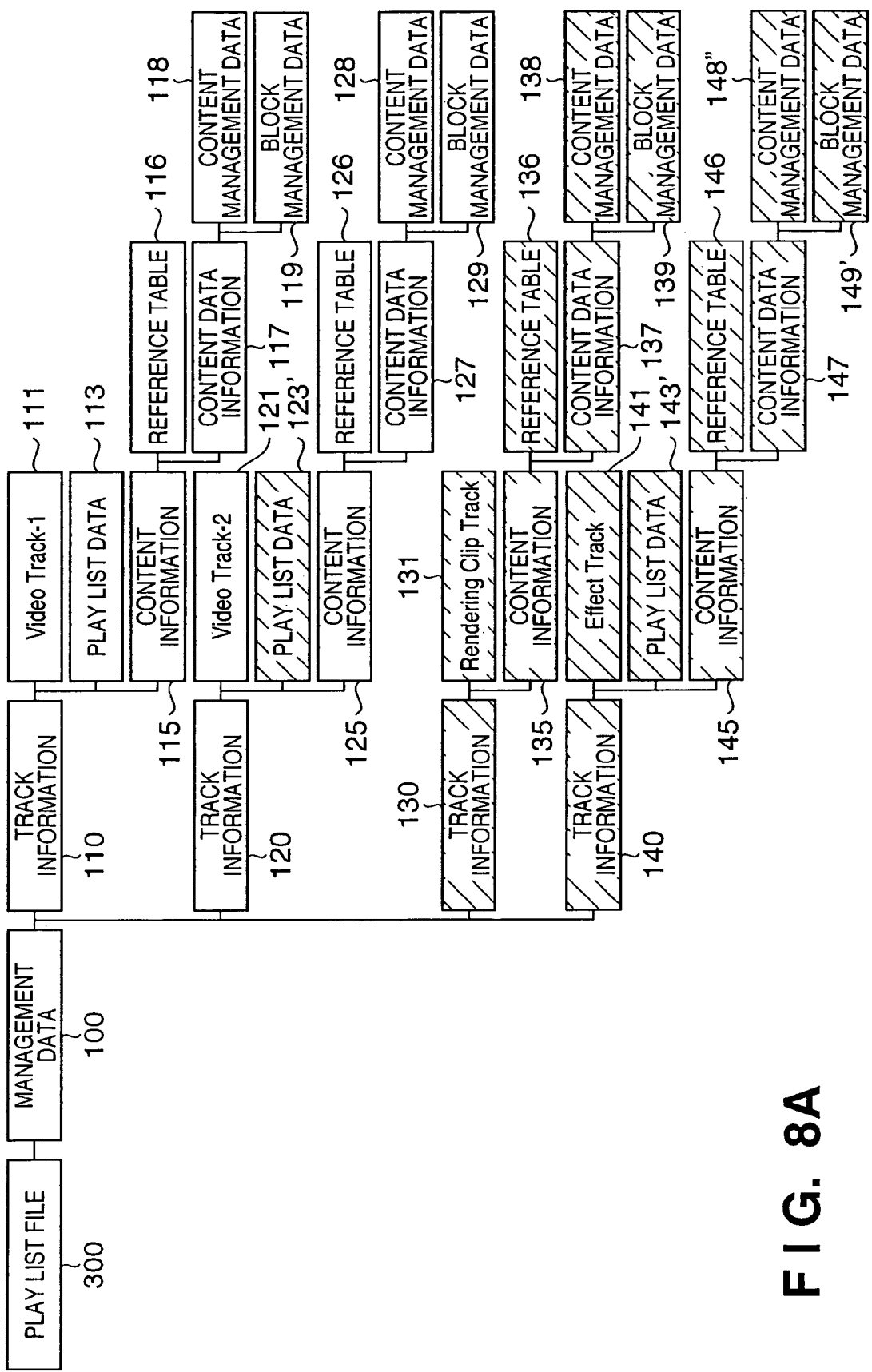
FIGS. 8A and 8B are views showing the tree structure of play list data according to the embodiment of the present invention.
Figure 8B:
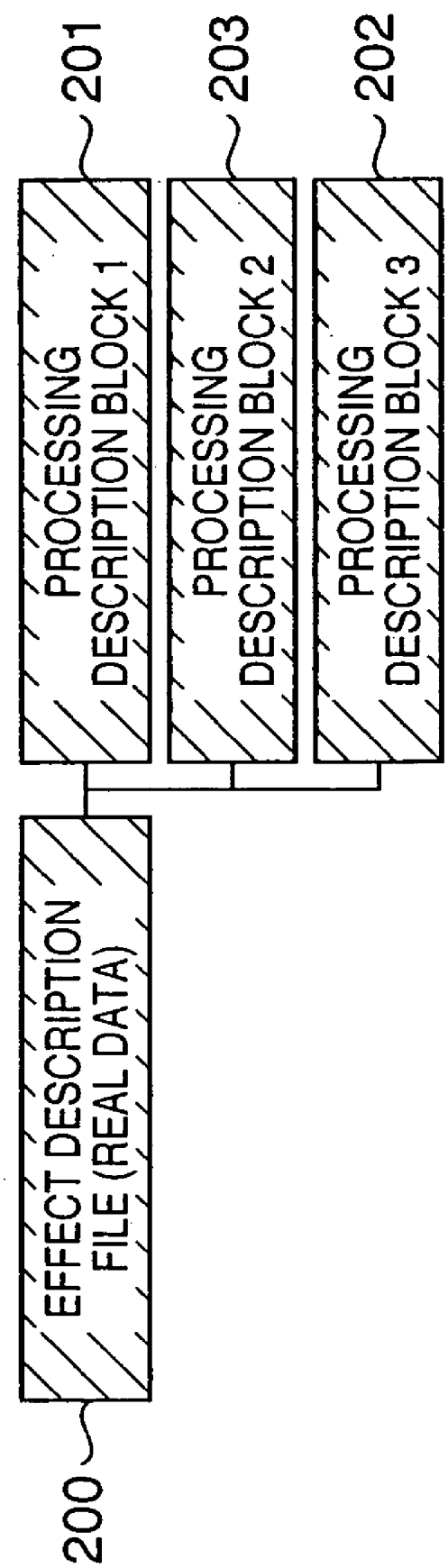

FIGS. 8A and 8B show the data tree structure of the play list.

Highlighted portions are changed or added in the data structure shown in FIG. 4. A description of the same data structure as in FIG. 3 will be omitted. Referring to FIG. 8A, Rendering Clip Track 130 and Effect Track 140 have track IDs 131 and 141, respectively. Effect Track has play list data 143. Contents 135 and 145 in the tracks have reference tables 136 and 146 as reference information to the actual movie take file and effect description file and pieces of content data information 137 and 147 representing the contents. The pieces of content data information include content management data 138 and 148 containing detailed information of the contents and block management data 139 and 149 which manage the playback times of data blocks in the contents, respectively. Referring to FIG. 8B, an effect description file 200 contains processing description blocks 201, 202, and 203.

FIGS. 9A to 9D show the actual data structure of the play list.

FIG. 9A shows the reference tables 136 and 146 shown in FIG. 8A. RndC.mpg is added in the reference table 136 of Rendering Clip Track. An effect description file Effect.dcr is added in the reference table 146 of Effect Track. FIG. 9B shows the play list data. In Video Track-1, playback of 4 sec from the start is set. In Video Track-2, playback of 4 sec from the start is set after a blank of 3 sec. In Effect Track, playback of 7 sec from the start is set. With this setting, play list payback of 7 sec in total described with reference to FIG. 7 is done. FIG. 9C shows the content management data. In the content management data 138 of Rendering Clip Track, R-1 is set as the content ID, and Mpeg2 movie is set as the content. In the content management data 148 of Effect Track, E-1 and E-2 as the content IDs and the control parameters of the effect and rendering clip are set.

E-1 indicates the Effect Track content corresponding to the no-effect portions of 0 to 3 sec and 4 to 7 sec described with reference to FIG. 7. Effect_Off is set as a flag for effect control. Rc_Off is set as a flag representing the presence/absence of rendering clip. E-2 indicates the Effect Track content corresponding to the portion of 3 to 4 sec in FIG. 7. Since the rendering clip is present, Rc_On is set.

The parameters of the rendering clip described with reference to FIG. 7 are recorded as the contents. Sw=On, In=3, Out=4, Shft=1, Blk=1-2, and Rendering Clip Track as the reference track ID are set. The meanings of the parameters are the same as in FIG. 7, and a repetitive description thereof will be omitted.

FIG. 9D shows the block management data 119, 129, 139, and 149 shown in FIG. 8A. In the block management data 119 of Video Track-1, a playback time table of data blocks 1 to 8 is set in correspondence with the content with the ID A-1. In the block management data 129 of Video Track-2, a playback time table of data blocks 1 to 8 is set in correspondence with the content with the ID B-1. In the block management data 139 of Rendering Clip Track, a playback time table of data blocks 1 and 2 is set in correspondence with the content with the ID R-1. For Effect Track, a playback time table of data blocks 1 and 3 is set in correspondence with the content with the ID E-1, and a playback time table of data block 2 is set in correspondence with the content with the ID E-2.

This description indicates that, in FIG. 7, each of MovieA.mpg and MovieB.mpg contains eight blocks of 0.5 sec each, and RndC.mpg contains two data blocks of 0.5 sec each, which should sequentially be played back.

FIG. 10 is a view showing an example of the effect description data 200 shown in FIG. 8B. In block 1 of data blocks 1 to 3 of Effect Track, the effect type is No Effect, and the source is Video Track-1. In block 2, the effect type is Wipe, and Video Track-1 and Video Track-2 are set as the source. Block 2 corresponds to the rendering clip. As described above, the type of transition effect or the like can be displayed on the editing window in accordance with the effect type described here. In block 3, the effect type is No Effect, and the source is Video Track-2.

Figure 11:
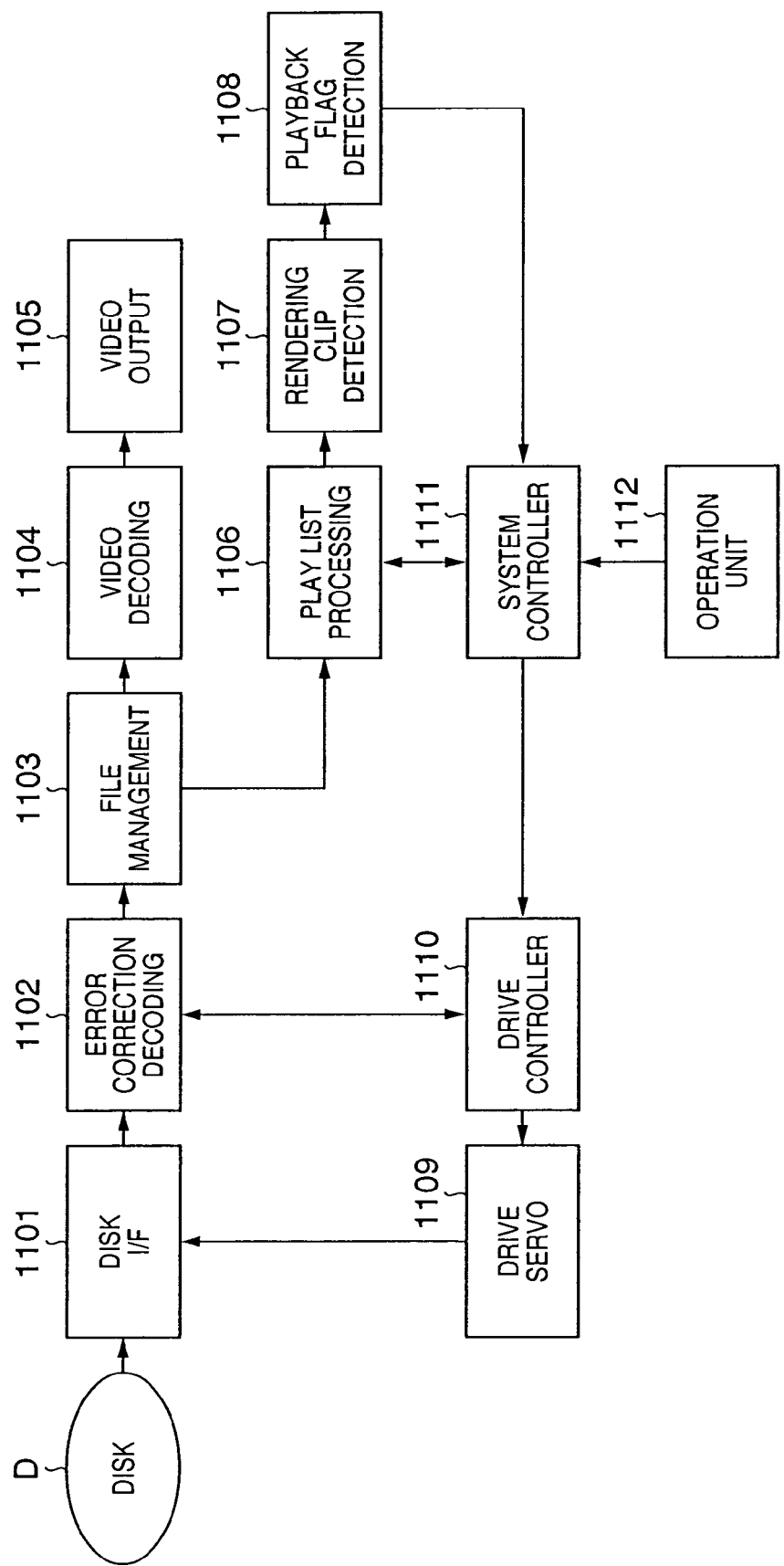
FIG. 11 is a block diagram for explaining a playback apparatus according to the embodiment of the present invention.

FIG. 11 is a block diagram showing the schematic arrangement of a playback apparatus which can record various kinds of files including the thus created rendering clip and execute playback based on the play list.

A drive controller 1110 inputs a signal to a drive servo circuit 1109 in accordance with a request from a system controller 1111 to control the optical pickup and motor in a disk I/F 1101, thereby controlling the data read from the disk D. An error correction decoding circuit 1102 corrects errors in data read from the disk D. A file management circuit 1103 detects various kinds of data from the error-corrected data sequence.

When a play list playback is instructed by an operation unit 1112, the system controller controls the drive controller 1110 to instruct playback of a play list file for the disk D. A play list processing circuit 1106 analyzes the play list file output from the file management circuit 1103, determines a data stream to be read out, and supplies it to the system controller 1111. If a rendering clip detection circuit 1107 detects the presence of rendering clip, i.e., Rc_On, the rendering clip playback processing described with reference to FIG. 7 starts.

When a playback flag detection circuit 1108 detects Sw=On, and playback of the rendering clip is validated, the system controller 1111 controls the drive controller 1110 to play back Rendering Clip Track instead of the original data track. A video decoding circuit 1104 decodes the moving image stream data in accordance with the play list and outputs the data through a video output circuit 1105.

FIG. 12 is a flowchart showing a playback track control operation by Rc_On and Sw flag.

In step S1201, Rc_On is determined. If YES in step S1201, the flow advances to playback flag determination processing. If NO in step S1201, normal play list playback is executed in step S1204. In step S1202, the playback flag is determined. If Sw=On, Rendering Clip Track playback in step S1203 is executed. If Sw=Off, normal play list playback in step S1204 is executed. If it is determined in step S1205 that a subsequent data block is present, the playback target is switched to the next data block in step S1206, and the above-described processing is repeated from step S1201.

According to this embodiment, when play list playback is to be executed for video data which contains a plurality of tracks and has undergone various kinds of effect processing, a rendering clip for which the effect processing has already been executed is created and played back. Accordingly, advanced effect processing can be implemented.

Figure 13:
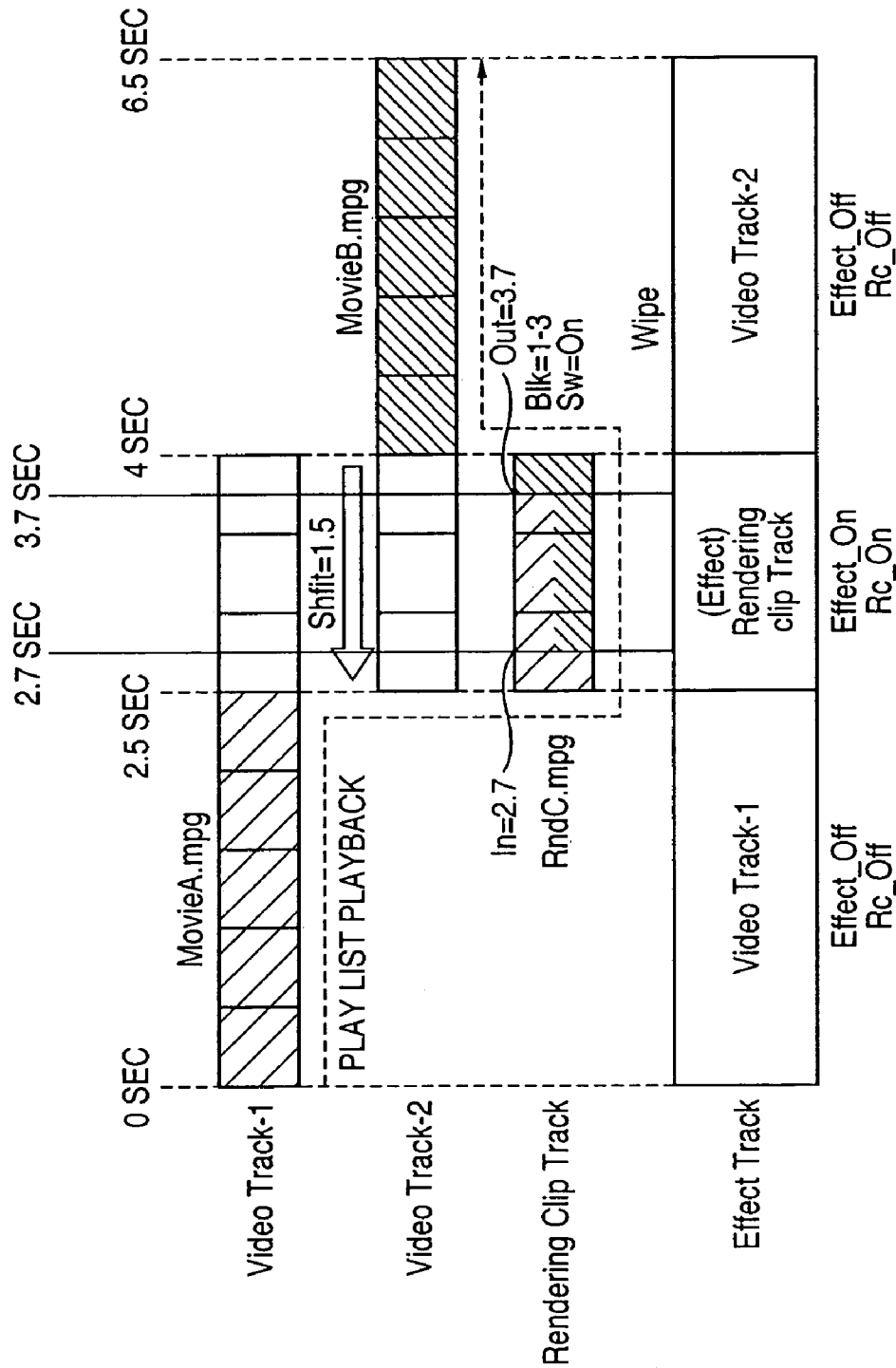
FIG. 13 is a view for explaining play list playback with effect according to the embodiment of the present invention, in which the data block boundary is adjusted.
Figure 15:
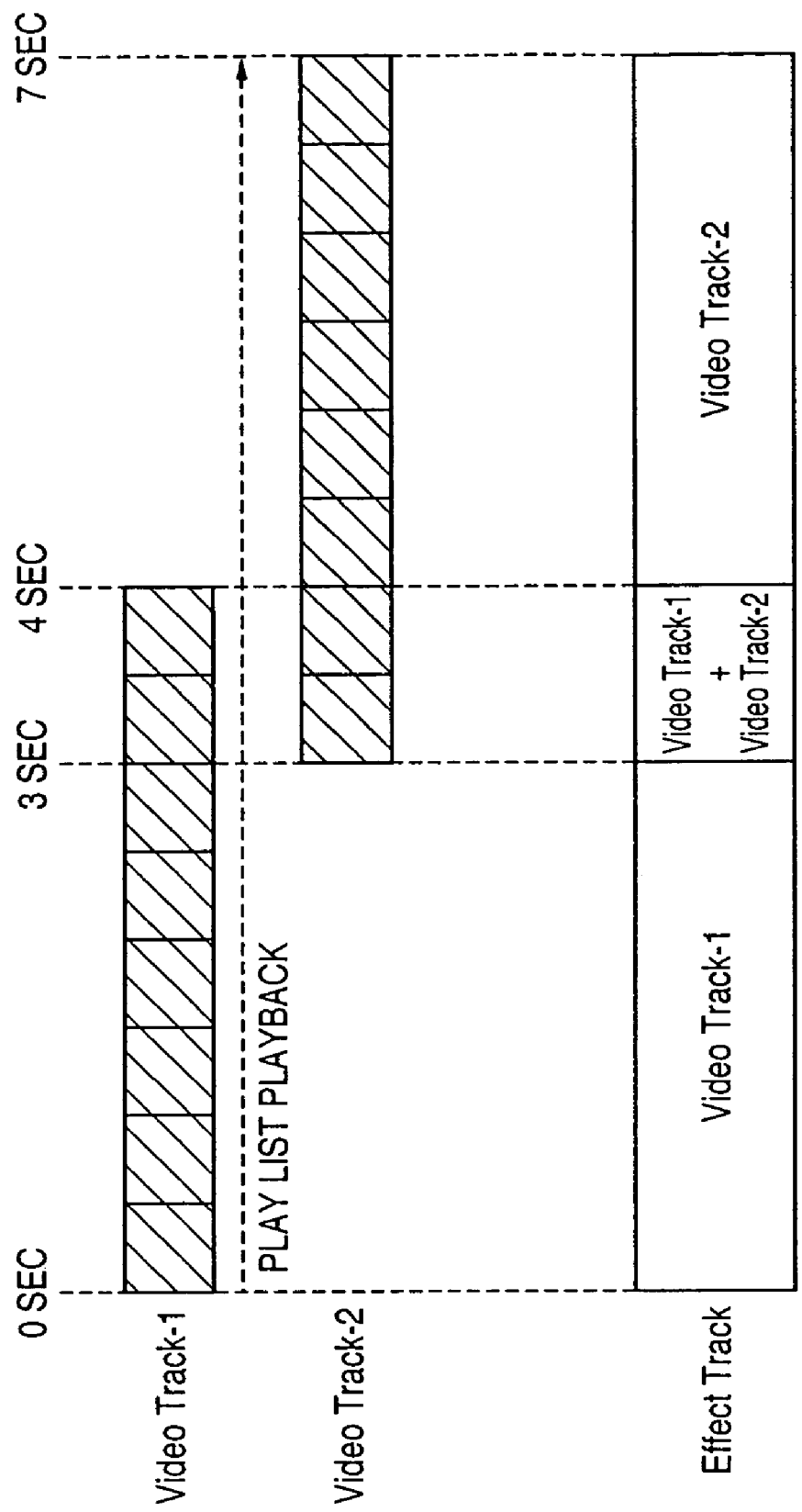
FIG. 15 is a view for explaining conventional play list playback by a real-time effect.
Figure 16B:
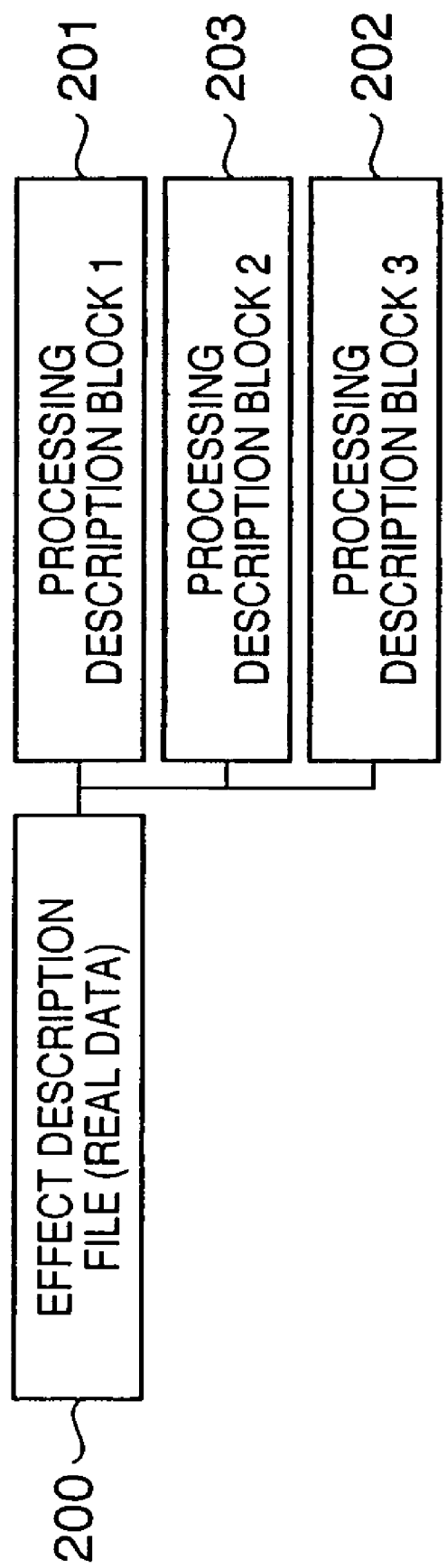

FIG. 13 shows an example in which the In and Out points of the actual effect do not coincide with the start and end points of the rendering clip.

This situation occurs for, e.g., GOP of MPEG2 in which playback can be executed only in a predetermined time unit. In this case, a rendering clip which includes an effect application section and has a length suitable for the playback data boundary must be created to apply a transition effect of arbitrary length.

MovieA.mpg is set from 0 to 4 sec in Video Track-1. MovieB.mpg is set from 2.5 to 6.5 sec in Video Track-2. The playback designation time of the Video Track-2 leads that shown in FIG. 3 by 1.5 sec. This is because the transition effect by wipe is produced at the 1-sec portion between Video Track-1 and Video Track-2, and an overlap including margin data for the data block boundary is necessary. As the margin data, the video data of the original data track is used.

In Rendering Clip Track, a rendering clip including the actual effect application section indicated by In=2.7 and Out=3.7 and also a portion where the preceding and subsequent moving image data are adjusted to the block boundary is set.

Shft is data which holds the log of 1.5-sec advance of MovieB.mpg, i.e., the subsequent moving image as the overlap amount by addition of the transition effect. This data is recorded in the content management data of Effect Track.

In and Out respectively represent the start position and end position of the actual transition effect in the rendering clip. In and Out are recorded in the content management data of Effect Track. As described above, since the margin portion for playback block boundary adjustment is present, In and Out do not coincide with the start and end points of the rendering clip.

A playback flag which controls playback of the rendering clip is also recorded in the content management data of Effect Track. When Sw=On, Rendering Clip Track is played back with a higher priority than the original video tracks Video Track-1 and Video Track-2 during the rendering clip period in the playback mode. In this example, MovieA.mpg is played back until 2.5 sec from the start of play list playback. Next, RndC.mpg is played back from 2.5 to 4 sec in accordance with the playback flag of the rendering clip. Finally, MovieB.mpg is played back from 4 to 7 sec.

Information which makes the content of Effect Track correspond to the data block of Rendering Clip Track is recorded in the content management data of Effect Track as Blk information. In this example, it is recorded that blocks 1 to 3 of Rendering Clip Track correspond to the content of Effect Track.

Information representing the effect content of the rendering clip is recorded in the effect description data. In this example, it is recorded that the effect type is Wipe effect. The effect content information is used to indicate that the transition effect is Wipe in, e.g., the input box 604 in FIG. 6 which shows an example of the story board editing window.

A flag to execute processing by the above-described rendering clip is also recorded in the content management data of Effect Track as Re_On. If no rendering clip is present, Re_Off is set, and the above-described processing is skipped.

The data tree structure of the play list is the same as in FIGS. 8A and 8B, and a description thereof will be omitted.

FIGS. 14A to 14D show the actual data structure of the play list.

FIG. 14A shows the reference tables 136 and 146 shown in FIG. 8A. RndC.mpg is added in the reference table 136 of Rendering Clip Track. An effect description file Effect.dcr is added in the reference table 146 of Effect Track. FIG. 14B shows the play list data. In Video Track-1, playback of 4 sec from the start is set. In Video Track-2, playback of 4 sec from the start is set after a blank of 2.5 sec. In Effect Track, playback of 6.5 sec from the start is set. With this setting, play list payback of 6.5 sec in total described with reference to FIG. 13 is done.

FIG. 14C shows the content management data. In the content management data 138 of Rendering Clip Track, R-1 is set as the content ID, and Mpeg2 movie is set as the content. In the content management data 148 of Effect Track, E-1 and E-2 as the content IDs and the control parameters of the effect and rendering clip are set.

E-1 indicates the Effect Track content corresponding to the no-effect portions of 0 to 2.5 sec and 4 to 6.5 sec described with reference to FIG. 13. Effect_Off is set as a flag for effect control. Rc_Off is set as a flag representing the presence/absence of rendering clip. E-2 indicates the Effect Track content corresponding to the portion of 2.5 to 4 sec in FIG. 13. Since the rendering clip is present, Rc_On is set.

The parameters of the rendering clip described with reference to FIG. 13 are recorded as the contents. Sw=On, In=2.7, Out=3.7, Shft=1.5, Blk=1-3, and Rendering Clip Track as the reference track ID are set. The meanings of the parameters are the same as in FIG. 13, and a repetitive description thereof will be omitted.

FIG. 14D shows the block management data 119, 129, 139, and 149 shown in FIG. 8A. In the block management data 119 of Video Track-1, a playback time table of data blocks 1 to 8 is set in correspondence with the content with the ID A-1. In the block management data 129 of Video Track-2, a playback time table of data blocks 1 to 8 is set in correspondence with the content with the ID B-1. In the block management data 139 of Rendering Clip Track, a playback time table of data blocks 1 to 3 is set in correspondence with the content with the ID R-1. For Effect Track, a playback time table of data blocks 1 and 3 is set in correspondence with the content with the ID E-1, and a playback time table of data block 2 is set in correspondence with the content with the ID E-2. This description indicates that, in FIG. 13, each of MovieA.mpg and MovieB.mpg contains eight blocks of 0.5 sec each, and RndC.mpg contains three data blocks of 0.5 sec each, which should sequentially be played back.

As described above, even when the encoding processing unit of image data does not coincide with the playback unit from a recording medium, effect processing can be executed for an arbitrary time by recording data representing a section with the effect in a rendering clip together.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-288867 filed on Aug. 7, 2003, which is hereby incorporated by reference herein.

What is claimed is:

1. An apparatus for processing video data comprising:
a play back unit configured to play back an original video file including original video data from a recording medium;
an instructing unit configured to instruct an image effect process on the original video file recorded on the recording medium;
an effect process unit configured to add an image effect of the image effect process to a designated period of the original video data played back from the recording medium and to generate effect video data of the designated period different from the original video data in accordance with an instruction of the image effect process from said instructing unit, the effect process unit adding the image effect of a type selected from a plurality of types of image effects;
a recording unit configured to record an effect video file including the effect video data generated by said effect process unit on the recording medium where the original video file is recorded; and
a play list processing unit configured to generate a play list file to control a playback sequence of the original video file and the effect video file recorded on the recording medium so that the original video file and the effect video file are subsequently played back, wherein the play list file includes effect type information indicating the type of the image effect of the effect video data recorded on the recording medium, wherein the play list file includes a first video track which includes first content information designating the original video file recorded on the recording medium and first reference information indicating play back time of the original video file, and the play list file further includes an effect video track which includes second content information designating the effect video file recorded on the recording medium and second reference information indicating play back time of the effect video file, wherein said recording unit further records the play list file generated by said play list processing unit on the recording medium where the original video file and the effect video file are recorded, and wherein said play back unit plays back a remaining period of the original video data other than the designated period of the original video data and the effect video data to which the image effect of the type indicated by the effect type information included in the play list file reproduced from the recording medium is added subsequently from the recording medium in accordance with the play list file reproduced from the recording medium.

2. An apparatus according to claim 1, wherein the play list file further includes effect track information which includes content information designating the effect type information representing the type of modification added on the effect video data.

3. An apparatus according to claim 2, wherein the effect track information includes time information representing playback time change amounts of said original video data whose playback times are changed in accordance with generation of the effect video data.

4. An apparatus according to claim 2, wherein the effect track information includes a control flag which indicates whether the effect video data should be played back.

5. An apparatus according to claim 2, wherein the effect track information includes section information representing a section of the effect video data, which has actually added the image effect process.

6. An apparatus according to claim 1, wherein the original video data is encoded, and said effect process unit generates the effect video data by encoding the original video data to which the image effect process is added.

7. An apparatus according to claim 1, further comprising:
a control unit configured to control said playback unit so as to play back the effect video data instead of the designated part of the original video data from the recording medium.

8. An apparatus according to claim 7, wherein said control unit controls said playback unit to play back the effect video data when a control flag which indicates whether the effect video data should be played back is ON, and to inhibit playback of the effect video data when the control flag is OFF.

9. An apparatus according to claim 1, wherein
said instructing unit instructs the image effect process of multiplexing the designated period of a first original video data and the designated period of a second original video data played back by said playback means, said effect process unit multiplexes the designated period of the first original video data and the designated period of the second original video data to generate the effect video data in accordance with the instruction of the image effect process of multiplexing by said instructing unit, and said play list processing unit generates the play list file to control a playback sequence of the first and second original video data and the effect video data so that the first original video data of a remaining period other than the designated period is played back, the effect video data is subsequently played back, and the second original video data of a remaining period other than the designated period is further subsequently played back.

10. An apparatus according to claim 1, wherein the play list file includes:
second video track information which includes third content information designating the second video data and third reference information indicating play back time of the second video data of the remaining part.

11. A method for processing video data comprising the steps of:
a play back step for playing back an original video file including video data from a recording medium;

an instructing step for instructing an image effect process on the original video file recorded on the recording medium;

a step of adding an image effect of the image effect process to a designated period of the original video data played back from the recording medium and for generating effect video data of the designated period different from the original video data in accordance with an instruction of the image effect process from said instructing step, the effect process step adding the image effect of a type selected from a plurality of types of image effects;

a recording step for recording video data generated by said effect process step on the recording medium where the original video file is recorded; and a step of generating a play list file to control a playback sequence of the original video file and the effect video file recorded on the recording medium so that the original video file and the effect video file are subsequently played back, wherein the play list file includes effect type information indicating the type of the image effect of the effect video data recorded on the recording medium, wherein the play list file includes a first video track which includes first content information designating the original video file recorded on the recording medium and first reference information indicating play back time of the first video file, and the play list file further includes an effect video track which includes second content information designating the modified file recorded on the recording medium and second reference information indicating play back time of the effect video file, and wherein said recording step further records the play list file generated by said play list generating step on the recording medium where the first video file and the effect video file are recorded, and wherein said play back unit plays back a remaining period of the original video data other than the designated period of the original video data and the effect video data to which the image effect of the type indicated by the effect type information included in the play list file reproduced from the recording medium is added subsequently from the recording medium in accordance with the play list file reproduced from the recording medium.

* * * * *